July 20, 1937.                A. Y. DODGE                2,087,373
                                CONDUIT
                          Filed Feb. 23, 1934

INVENTOR.
ADIEL Y. DODGE
BY
ATTORNEY

Patented July 20, 1937

2,087,373

UNITED STATES PATENT OFFICE 2,087,373

CONDUIT

Adiel Y. Dodge, South Bend, Ind., assignor to Bendix Brake Company, South Bend, Ind., a corporation of Illinois Application February 23, 1934, Serial No. 712,619

8 Claims. (Cl. 64—3)

This invention relates to flexible conduits, and is illustrated as embodied in a helically-wound wire conduit intended for use as the outer member of a Bowden-type control for an automobile brake.

Objects of the invention are to provide an improved conduit wound from a single strand of wire, and one which will not substantially change in length when bent, at least along a central neutral axis which passes through a cable passing through the conduit; also to reduce the friction on the cable and to eliminate sharp edges which might engage and injure the cable.

Preferably the conduit is made by winding helically a strand of wire which is stretched and deformed as it is wound, and which has an initial cross-section such that the successive convolutions of the finished conduit seat in each other with a sort of ball and socket action.

Figure 1:
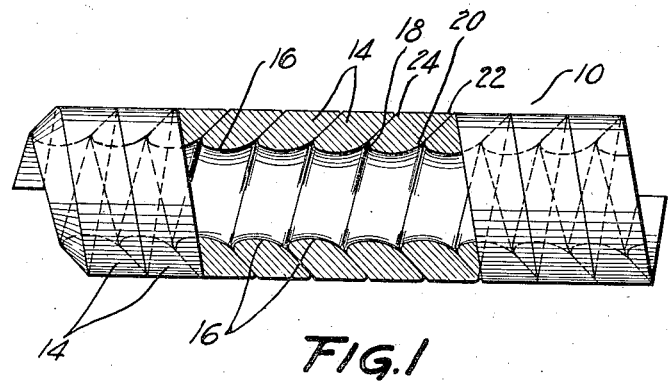
Figure 2:
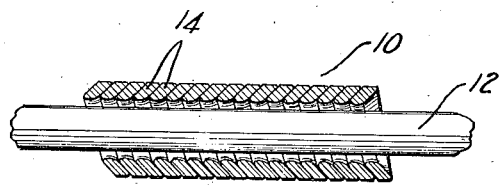

The above and other objects and features of the invention, including various desirable specific structural features, will be apparent from the following description of the illustrative embodiment shown in the accompanying drawing, in which:

Figure 1 is a side elevation of a short section of the conduit, partly broken away in central section; and Figure 2 is a central longitudinal section through a short section of the conduit, with a cable in place therein.

The illustrated conduit is made according to the method described and claimed in my application No. 454,588, filed May 22, 1930, now Patent 1,981,950 issued November 27, 1934, of which the present application is a partial continuation. This conduit is made by utilizing a wire of trapezoidal section, which is stretched and deformed as it is wound into a helix, to give the illustrated conduit 10, intended as a flexible sheath or Bowden-type casing for a steel cable 12 or other flexible tension element.

The adjacent convolutions 14 of the finished conduit are substantially rhombic or rhomboidal in cross section having their inner faces 16 rounded or curved to prevent any sharp corners engaging and possibly injuring the cable 12 and to diminish the friction between the cable and conduit, and with rounded corners 18, 20, and 22. The fourth corner 24 may or may not be rounded, as desired.

In order to permit a conduit to flex, without opening up between the adjacent convolutions on the outer side of the conduit, it is necessary that a ball and socket action be produced to permit a rolling action between successive convolutions. In this manner, when the conduit is flexed the adjacent convolutions move with reference to each other so that the inner radius of the conduit is shortened while the outer radius is lengthened, and the neutral axis of the conduit remains a constant length. The rounded corners 18, 20, and 22 permit the necessary movement between the adjacent convolutions with the minimum of friction. It thus appears that as the conduit is deflected, the rounded corner 18 of one convolution will slide upwardly on the side walls of the adjacent convolution, and the rounded corner 22 will slide on the surface of the side walls of the adjacent convolution on the inner side of the arc to maintain the neutral axis of the conduit a constant length.

The angle which the substantially parallel side walls of the successive convolutions make with reference to the neutral axis of the conduit, is one of the important features which determine whether the conduit will open up and whether it will remain constant length or become longer or shorter upon deflection. It is, of course, possible to design conduits which will lengthen or shorten or remain constant lengths upon deflection, by varying the proportions and angles of the strand of material from which the conduit is formed.

The sides of the convolutions may, if desired, be on slight curves having their centers in the axis of the conduit, to form true ball and socket joints, the curve on the outer side being convex and the one on the inner side concave, but generally they are (in section) parallel inclined lines tangent to such curves, so that the successive convolutions nest one within the next, forming in this case also substantially a series of ball and socket joints. In either case, it will be noted, in a section such as Figure 1 a line perpendicular to the side of one of the convolutions will intersect the conduit axis preferably at the center of the next convolution. In effect, therefore, each convolution pivots upon the next convolution, the tangent straight lines for such short distances not acting substantially different from true curves.

It will be observed that, no matter how the conduit is bent, its axial length does not substantially change, and that the surfaces engaging the cable 12 are always rounded convex surfaces offering a minimum of friction and giving no sharp edges which might fray and abrade the cable.

While one illustrative embodiment has been described in detail, it is not my intention to limit the scope of the invention to that particular embodiment, or otherwise than by the terms of the appended claims.

I claim:

1. A constant length conduit adapted to receive a cable, said conduit comprising a series of engaging convolutions formed from a single strand of drawn wire of rhomboidal cross sectional shape, each convolution having rounded inner surfaces terminating in rounded corners adapted to facilitate deformation of the conduit without separating the successive convolutions of the cable.

2. A conduit comprising a plurality of nesting convolutions formed of a single strand of wire of generally rhomboidal cross section provided with a plurality of rounded corners, the nesting convolutions engaging each other in a surface at an acute angle to the axis of the conduit.

3. A conduit adapted to receive a cable comprising a helix formed of a single strand of wire, each convolution of which is substantially rhomboidal in cross section, the inner surface of each convolution being rounded and terminating in rounded corners to present a smooth surface to the cable as the conduit is bent to minimize abrasion of the conduit or cable and engaging successive convolutions in surface contact when the conduit is bent.

4. A conduit comprising a plurality of engaging convolutions of a single strand of drawn wire of rhombic cross section having rounded inner surfaces terminating in rounded corners to minimize abrasion, the angle between the neutral axis of the conduit and the side walls of the convolutions being selected so that a line perpendicular to the side of one of the convolutions will intersect the conduit axis substantially at the center of the next convolution to avoid a lengthening at the neutral axis of the conduit when the conduit is bent.

5. A conduit comprising a plurality of nesting convolutions formed of a single strand of wire of generally rhomboidal cross section provided with a plurality of rounded corners, the nesting convolutions engaging each other in a surface at an acute angle to the axis of the conduit.

6. A helical conduit of wire with coacting contacting surfaces formed of a single strand of wire of generally rhomboidal cross section having three rounded corners and so shaped that when the surfaces slide over each other they engage each other in a surface at an acute angle to the axis of the conduit and the one side increases in length and the side opposite thereto decreases in length when the conduit is bent to maintain substantially a constant length at the neutral axis of the conduit.

7. A conduit comprising a plurality of convolutions of drawn wire of substantially rhomboidal cross section each convolution having the rounded corners and nesting in the adjacent convolution in such manner that when the conduit is bent the convolutions slide on the adjacent convolution to shorten the effective length of the inner radius and to lengthen the outer radius to maintain the length of the conduit at the neutral axis constant, the rounded corners of one convolution sliding on the side walls of the adjacent convolutions to prevent the conduit from opening up.

8. A conduit for a brake control or the like formed of a single strand of drawn wire of substantially rhomboidal cross section having a plurality of rounded corners and formed as a helical flexible coil with adjacent convolutions nesting one within another for turning on each other with the ball and socket action at an acute angle to the neutral axis of the conduit.

ADIEL Y. DODGE.